May 1, 1951

A. MARTIN 2,550,839

SAFETY DEVICE FOR LIFTING AND
LOWERING APPARATUS

Filed May 24, 1949

INVENTOR..
Allan Martin
BY John J. V. Armstrong
ATTORNEY

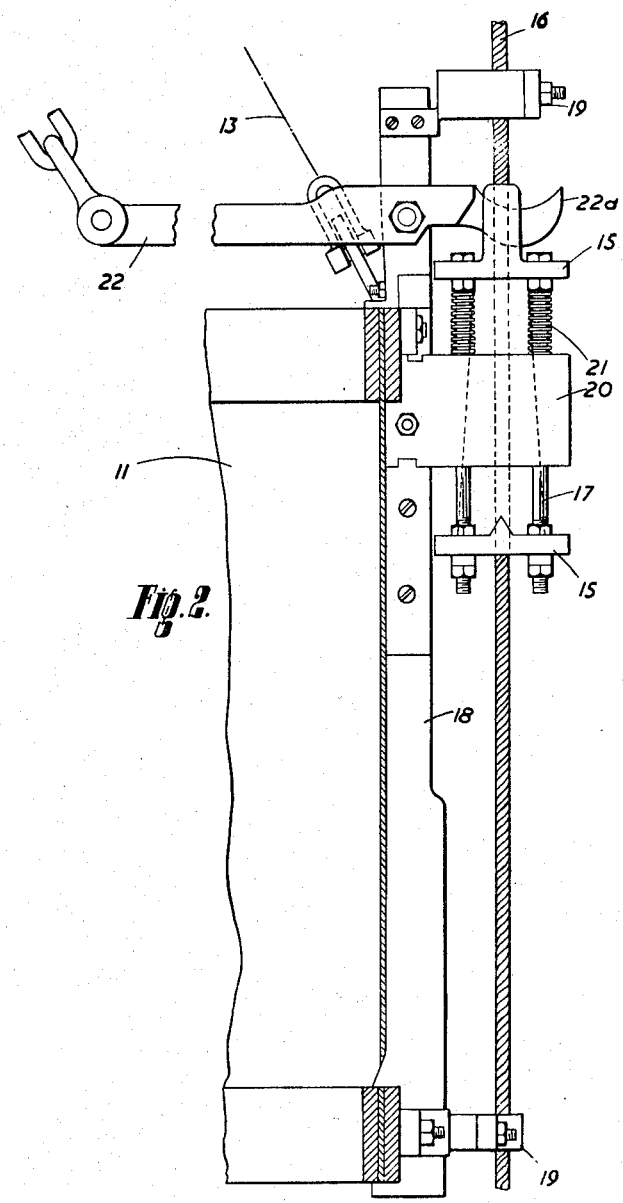

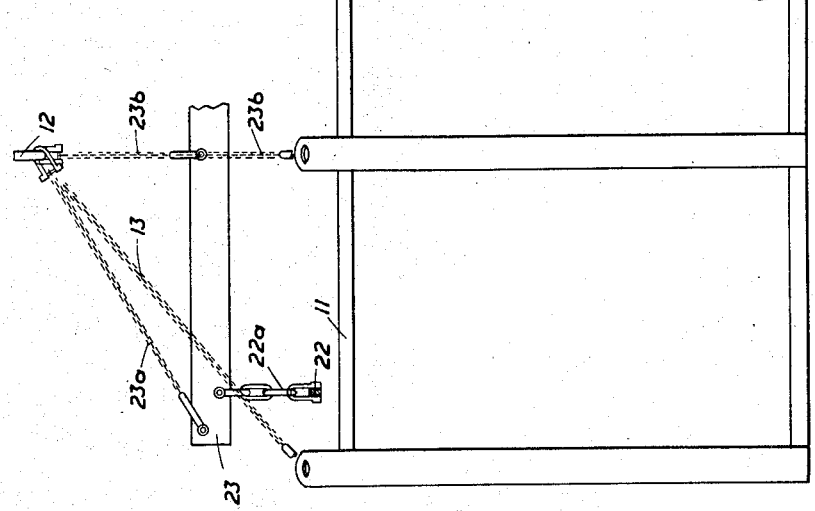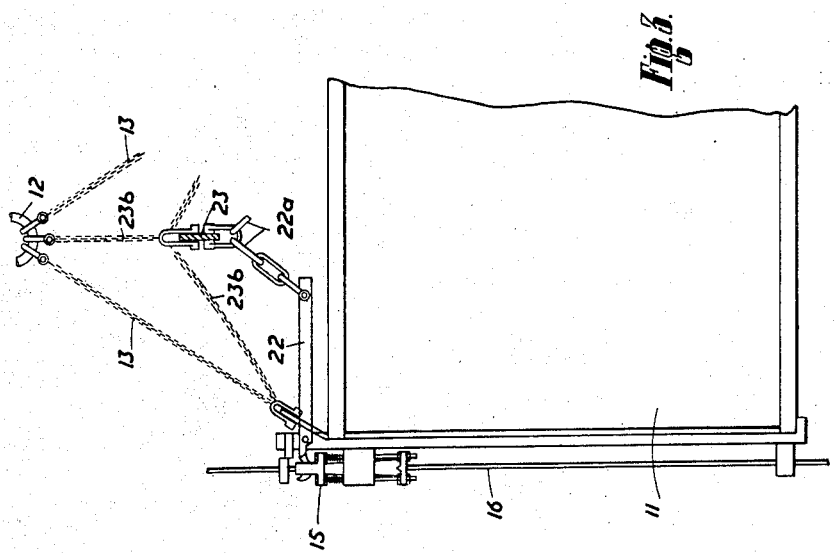

Patented May 1, 1951

2,550,839

UNITED STATES PATENT OFFICE 2,550,839

SAFETY DEVICE FOR LIFTING AND LOWERING APPARATUS

Allan Martin, Ebbw Vale, Wales

Application May 24, 1949, Serial No. 95,122
In Great Britain May 28, 1948

1 Claim. (Cl. 187—88)

This invention concerns a safety device for use in conjunction with lifting and lowering apparatus such as pit head gear, hoists, and elevators or lifts.

An object of the invention is to provide a simple device which will co-operate with a guide rope in a lifting and lowering apparatus to effect braking action under emergency conditions, that is to say in the event of the main rope becoming broken or disconnected.

According to this invention the safety device includes a conical wedge adapted to engage around a guide rope under emergency conditions.

The conical wedge is preferably constrained against spring action into a position clear of the guide rope during normal operation of the lifting and lowering apparatus but arranged so that, when an emergency obtains, it is forced by spring pressure so as to become frictionally engaged with the guide rope.

There are conveniently two conical wedges, each of nearly semi-annular section, disposed around a guide rope so that a conical external wedge is presented. A complementary member which preferably presents an internal conical surface may be provided to serve as an operative abutment for each of the semi-annular conical wedges.

The invention will be described further, by way of example, with reference to the accompanying drawings in which:

Fig. 2 is a fragmentary end elevation;

Fig. 3 is a diagrammatic view of the device as seen in Fig. 2 showing the operative connections of the device; and Fig. 4 is an end elevation of the operative connections as seen in Fig. 3, certain parts being omitted.

Figure 1:
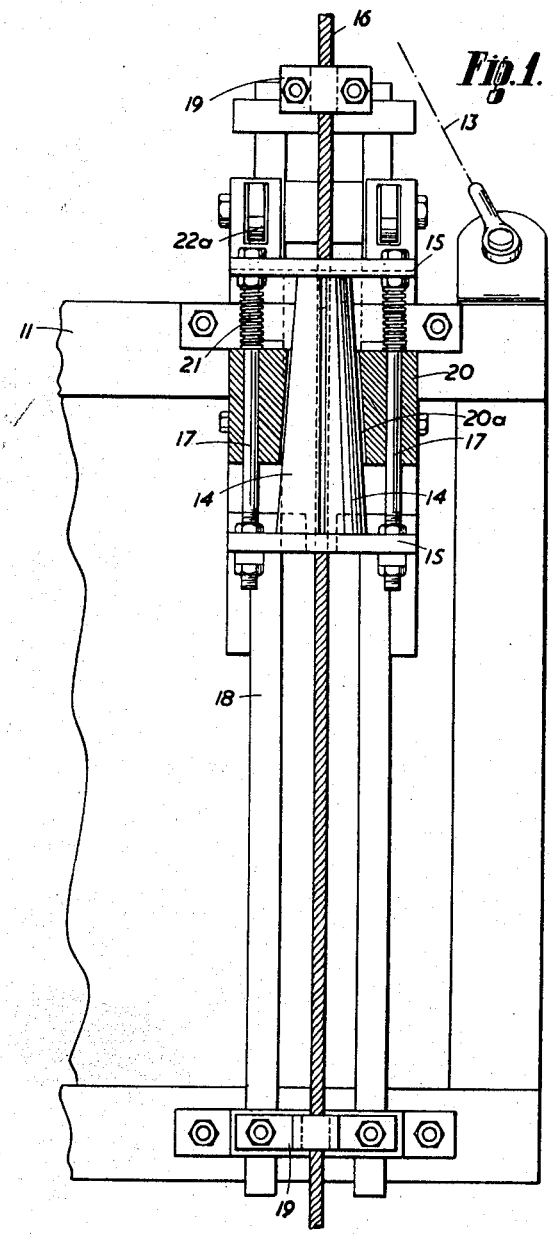
Fig. 1 is a fragmentary side elevation, partly in section, showing a preferred form of safety device in its relationship to part of a cage of a pit head gear.

A cage 11 is suspended from a ring 12 of a main rope by means of pin bridle chains 13.

Safety devices in accordance with the invention are fitted to each corner of the cage to co-operate with four guide ropes. In the drawings one device only is shown, for the sake of clarity.

Two conical wedges 14, each of semi-annular horizontal section are held between upper and lower plates 15 so as to surround each guide rope 16. The upper and lower plates are each approximately square in plan and are interconnected by four bolts 17, each bolt passing through a hole near the corner of each plate. The virtual apex of the cone is upwardly directed. Fixed to the cage 11 is a guide frame 18 comprising upper and lower guide shoes 19 forming bearings adapted to co-operate with a guide rope 16 and between these shoes there is a central block 20 having a conical vertically extending bore 20$^a$ disposed with its axis in alignment with the axes of the two guide shoes. The shape of this conical bore is substantially complementary to that of the external surface of the two semi-annular conical wedges 14. There are four bores 20$^b$ disposed around the aforementioned conical bore. The shanks of the four bolts 17 interconnecting the upper and lower plates 15 pass through these bores, and coil springs 21 are disposed between the central block 20 and the upper plate 15 so as to urge the upper plate and therewith, through the intermediary of the bolts and the lower plate, the two conical wedges 14 in an upward direction. A lever 22 fulcrumed to the guide frame between the central block 20 and the upper guide shoe 19 has one end connected by chains 22$^a$ to a transverse bar 23 suspended by two chains 23$^a$ from the ring 12, so as to be urged upwardly as a result of pull on the main rope, and has lugs 22$^a$ at its other end to co-operate with eyeleted lugs 15$^a$ on the aforementioned upper plate. Slack bridle chains 23$^b$ join the bar to the ring and to two sides of the cage.

Thus while the main rope is in tension under normal operation conditions the lever causes downward pressure on the upper plate compressing the four springs and holding the two conical wedges in a lower terminal position substantially clear of the guide rope. In the event of an emergency such as would be caused by breakage of the main rope, the bar drops allowing the springs to urge the two conical wedges upwardly by way of the upper plate, the bolts and the lower plate. This upward movement of the wedges causes engagement of their outer surfaces with the conical bore in the central block effectively wedging them into frictional engagement with the guide rope, causing braking action.

Such a device if properly constructed operates relatively silently and with substantial avoidance of shock. Moreover it avoids damage or undue wear on the guide rope and is readily released after the emergency condition has ceased to obtain.

I claim:

A mechanism for operating a safety device on a lifting and lowering apparatus, including a cage, a main rope supporting said cage and a guide rope adapted to guide said cage, said safety device of the type in which a gripper mechanism mounted on the cage of the apparatus is adapted to co-operate with the guide rope for the cage to grip the guide rope in the event of decrease in normal tension of the main rope and to be held in the inoperative position responsive to normal tension of the main rope; comprising in combination a bar supported horizontally from the main rope and above the cage, a lever disposed above the cage and below the bar and pivoted to the upper part of the cage and having one end in engagement with the gripper mechanism, and a non-rigid connection between the bar and the other end of said lever to maintain said other end of said lever raised to hold the gripper mechanism in the inoperative position responsive to normal tension of the main rope.

ALLAN MARTIN.

REFERENCES CITED

The following references are of record in the file of this patent:

FOREIGN PATENTS

| Number | Country | Date |
|---|---|---|
| 20,501 | Great Britain | Sept. 29, 1908 |
| 19,925 | Great Britain | Sept. 8, 1911 |